(12) United States Patent
Lin et al.

(10) Patent No.: US 9,599,310 B2
(45) Date of Patent: Mar. 21, 2017

(54) LIGHT GUIDE ELEMENT FOR CONTROLLING LIGHT DISTRIBUTION AND LAMP

(71) Applicant: Radiant Opto-Electronics Corporation, Kaohsiung (TW)

(72) Inventors: Wei-Chen Lin, Kaohsiung (TW); Guo-Hao Huang, Kaohsiung (TW)

(73) Assignee: Radiant Opto-Electronics Corporation, Kaohsiung (TW)

(*) Notice: Subject to any disclaimer, the term of this patent is extended or adjusted under 35 U.S.C. 154(b) by 166 days.

(21) Appl. No.: 14/656,723

(22) Filed: Mar. 13, 2015

(65) Prior Publication Data

US 2015/0184827 A1 Jul. 2, 2015

Related U.S. Application Data

(63) Continuation-in-part of application No. 13/972,926, filed on Aug. 22, 2013, now Pat. No. 9,033,552.

(30) Foreign Application Priority Data

May 3, 2013 (TW) .............................. 102115900 A

(51) Int. Cl.
*F21V 7/00* (2006.01)
*F21V 5/04* (2006.01)
(Continued)

(52) U.S. Cl.
CPC .................. *F21V 5/04* (2013.01); *F21K 9/61* (2016.08); *F21V 5/046* (2013.01); *F21V 7/005* (2013.01);
(Continued)

(58) Field of Classification Search
CPC ......... F21V 5/046; F21V 17/06; F21V 19/003
See application file for complete search history.

(56) References Cited

U.S. PATENT DOCUMENTS

| 4,698,730 A * | 10/1987 | Sakai | ........................ F21V 5/04 257/E33.072 |
| 8,292,469 B2 * | 10/2012 | Ku | .......................... H01L 33/58 362/311.02 |
| 8,864,343 B2 * | 10/2014 | Inoue | ..................... F21V 13/04 362/296.08 |
| 2006/0209558 A1 * | 9/2006 | Chinniah | .............. F21S 48/215 362/545 |

(Continued)

FOREIGN PATENT DOCUMENTS

| CN | 2505986 Y | 8/2002 |
| CN | 102369537 A | 3/2012 |

(Continued)

*Primary Examiner* — Evan Dzierzynski
(74) *Attorney, Agent, or Firm* — CKC & Partners Co., Ltd.

(57) ABSTRACT

A light guide element and a lamp are provided. The light guide element includes a light-incident surface, a light-emitting surface, an outer surface and an inner surface. The light-incident surface has a first outer peripheral edge and a first inner peripheral edge. The light-emitting surface is opposite to the light-incident surface and has a second outer peripheral edge and a second inner peripheral edge. The outer surface connects the first outer peripheral edge and the second outer peripheral edge. The inner surface connects the first inner peripheral edge and the second inner peripheral edge. A first opening defined by the inner surface adjacent to the first inner peripheral edge is larger than a second opening defined by the inner surface adjacent to the second inner peripheral edge.

15 Claims, 20 Drawing Sheets

(51) Int. Cl.
  *F21V 17/06* (2006.01)
  *F21V 19/00* (2006.01)
  *F21V 8/00* (2006.01)
  *G02B 19/00* (2006.01)
  *G02B 27/09* (2006.01)
  *F21Y 101/00* (2016.01)

(52) U.S. Cl.
  CPC ............ *F21V 7/0091* (2013.01); *F21V 17/06* (2013.01); *F21V 19/003* (2013.01); *G02B 6/0001* (2013.01); *G02B 19/0028* (2013.01); *G02B 19/0066* (2013.01); *F21Y 2101/00* (2013.01); *G02B 27/0994* (2013.01)

(56) References Cited

U.S. PATENT DOCUMENTS

2013/0229808 A1* 9/2013 Wang .................. F21V 5/04
                                                    362/311.01

FOREIGN PATENT DOCUMENTS

| CN | 102374418 A  | 3/2012  |
|----|--------------|---------|
| CN | 102654275 A  | 9/2012  |
| CN | 102705776 A  | 10/2012 |
| CN | 203810120 U  | 9/2014  |
| JP | 2003086006 A | 3/2003  |
| TW | 201241364 A  | 10/2012 |
| TW | 201243239 A  | 11/2012 |
| TW | 201443371 A  | 11/2014 |
| WO | 2009001272 A1| 12/2008 |

\* cited by examiner

LIGHT GUIDE ELEMENT FOR CONTROLLING LIGHT DISTRIBUTION AND LAMP

RELATED APPLICATIONS

This application is a continuation-in-part application of U.S. application Ser. No. 13/972,926, filed on Aug. 22, 2013, which claims priority to Taiwan Application Serial Number 102115900, filed May 3, 2013. The entire disclosures of all the above applications are hereby incorporated by reference herein.

BACKGROUND

Field of the Invention

The present invention relates to a light guide element, and more particularly to a light guide element for controlling a light distribution and the application thereof.

Description of Related Art

A conventional lamp consists essentially of a bulb and a reflecting mask. The reflecting mask mainly functions to guide light generated from the bulb to a required direction and to change light distributions generated while the bulb irradiates. However, the light distributions varied through the reflecting mask have limited diversities, and are usually a light-concentrating type, thus having limited applicability of the lamp.

Another conventional lamp can change a light distribution generated from a light source by collaborating with a secondary optical element. However, in this structure, a recess has to be disposed in a center of the optical element to receive the light source for achieving the object of light distribution adjustment. Thus, the secondary optical element has to match with different types or quantities of light sources to change the whole structure design, thus resulting in cost increase.

Hence, a light guide element is needed to overcome the foregoing problems.

SUMMARY

One aspect of the present invention is to provide a light guide element for controlling a light distribution by using a total reflection characteristic of a light beam to change a travel direction of the light beam, thus achieving an object of adjusting the light form emitted from the light guide element. Therefore, applications of the light guide element may meet irradiation requirements of various light beam angles, and also reduce power consumption.

Another aspect of the present invention is to provide a light guide element for controlling a light distribution by using profile curves to change curved surface shapes of a first reflecting surface, a second reflecting surface and a light-emitting surface, thereby adjusting a travel direction of a light beam in the light guide element to achieve an object of adjusting the light form emitted from the light guide element.

Another aspect of the present invention is to provide a light guide element for controlling a light distribution by using a Bezier curve function to define respective profile curves, thus not only simplifying definition rules of respective curved surfaces but also controlling an overall profile shape of the light guide element in an intuitive manner.

According to the aforementioned objects, the present invention provides a light guide element for controlling a light distribution. The light guide element includes a light-incident surface, a light-emitting surface, an outer surface and an inner surface. The light-incident surface has a first outer peripheral edge and a first inner peripheral edge. The light-emitting surface is opposite to the light-incident surface and has a second outer peripheral edge and a second inner peripheral edge. The outer surface connects the first outer peripheral edge and the second outer peripheral edge. The inner surface connects the first inner peripheral edge and the second inner peripheral edge. A first opening defined by the inner surface adjacent to the first inner peripheral edge is larger than a second opening defined by the inner surface adjacent to the second inner peripheral edge.

According to an embodiment of the present invention, the first opening is located at the light-incident surface, the second opening is located at the light-emitting surface, and a diameter of the first opening larger than a diameter of the second opening.

According to an embodiment of the present invention, an annular trench is disposed on the light-incident surface.

According to an embodiment of the present invention, the light guide element has a first segment with curvature and a second segment without curvature.

According to an embodiment of the present invention, the second segment is more protruding than the first segment.

According to an embodiment of the present invention, the light guide element further includes a convex lug adjacent to the light-incident surface.

According to the aforementioned objects, the present invention provides a lamp. The lamp includes a base, a light source, a socket and the aforementioned light guide element. The light source is disposed on the base. The socket is disposed on the base and fixes the light source on the base. The light guide element is engaged with the socket, in which the light source faces the light-incident surface of the light guide element.

According to an embodiment of the present invention, the first opening is located at the light-incident surface, the second opening is located at the light-emitting surface, and a diameter of the first opening is larger than a diameter of the second opening.

According to an embodiment of the present invention, an annular trench is disposed on the light-incident surface, and the light source is located in the annular trench.

According to an embodiment of the present invention, the light guide element has a first segment with curvature and a second segment without curvature.

According to an embodiment of the present invention, the second segment is more protruding than the first segment.

According to an embodiment of the present invention, the light guide element further includes a convex lug adjacent to the light-incident surface, the socket further includes a flange engaged with the convex lug.

According to an embodiment of the present invention, light source includes a circuit board and a plurality of light emitting diodes disposed on the circuit board in annular arrangement.

According to an embodiment of the present invention, the circuit board has a protruding portion, and the socket has a notch engaged with the protruding portion of the circuit board.

According to an embodiment of the present invention, the socket is fixed on the base by screwing members.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
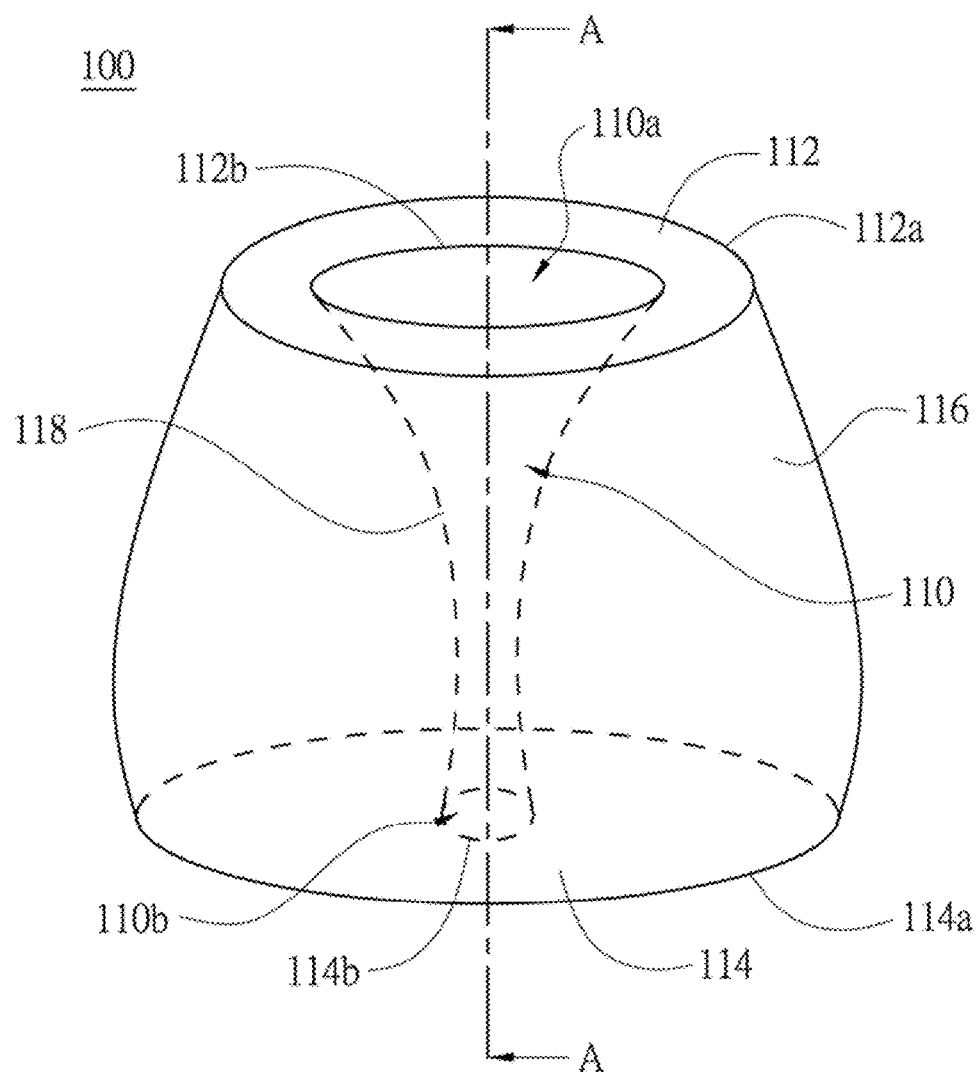
FIG. 1A is a schematic structural diagram showing a light guide element in accordance with a first embodiment of the present invention.
Figure 1B:
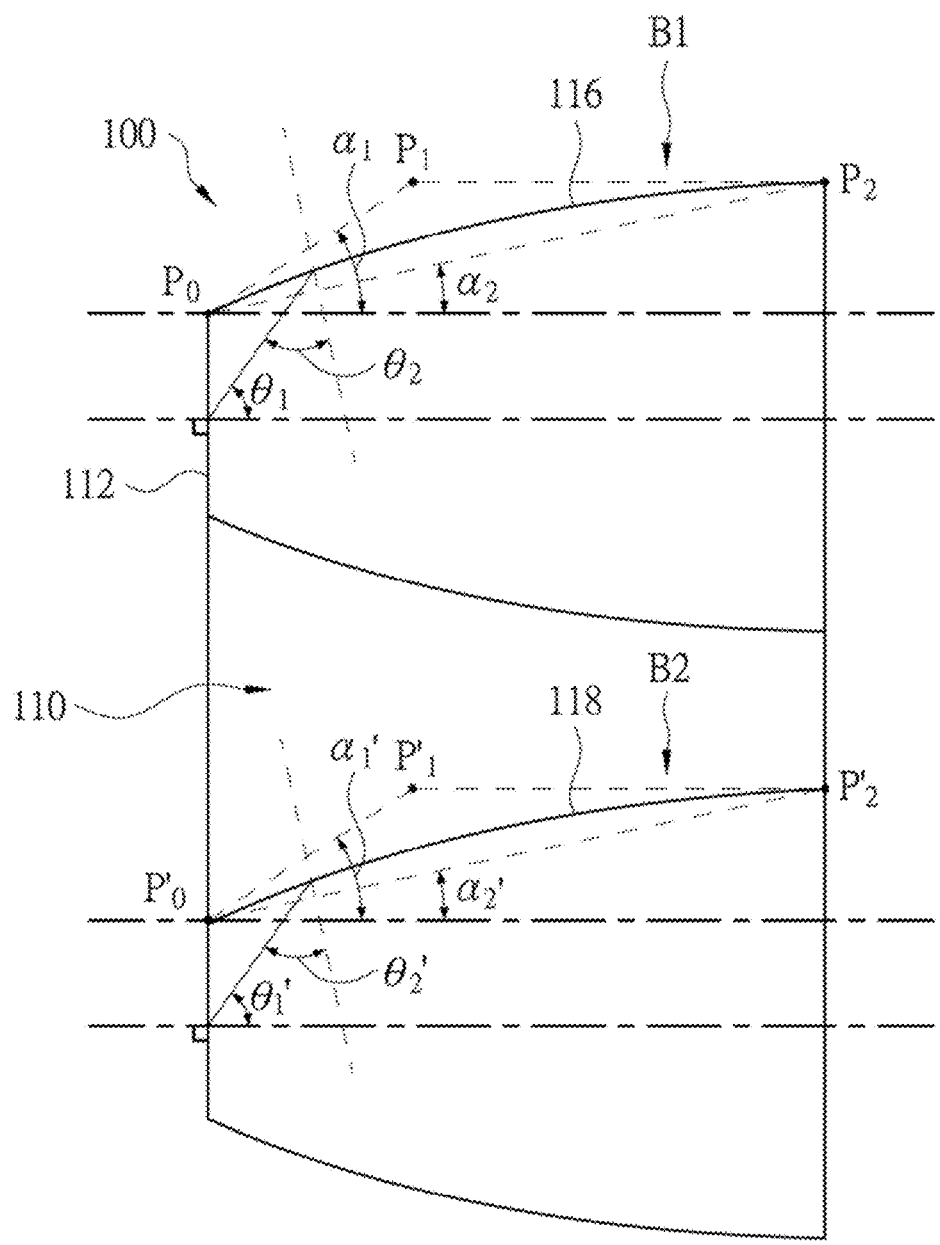
FIG. 1B is a schematic cross-sectional view of the light guide element viewed along a line A-A in FIG. 1A.

Referring to FIGS. 1A and 1B, FIG. 1A is a schematic structural diagram of a light guide element 100 in accordance with a first embodiment, and FIG. 1B is a schematic cross-sectional view of the light guide element 100 viewed along a line A-A in FIG. 1A. In the present embodiment, the light guide element 100 is suitable for use in guiding a light beam and enabling the light beam to be totally reflected in the light guide element 100 so as to generate different light beam angles. In the present embodiment, the light beam may come from a light source, such as a light emitting diode (LED). The light guide element 100 is an annular frustum having a through hole 110. The light guide element 100 includes a light-incident surface 112, a light-emitting surface 114, a first reflecting surface 116 and a second reflecting surface 118. The through hole 110 forms a first opening 110a on the light-incident surface 112, and the light-incident surface 112 has a first outer peripheral edge 112a and a first inner peripheral edge 112b. The light-emitting surface 114 is opposite to the light-incident surface 112. The through hole 110 forms a second opening 110b on the light-emitting surface 114, and the light-emitting surface 114 has a second outer peripheral edge 114a and a second inner peripheral edge 114b.

The first reflecting surface 116 connects the first outer peripheral edge 112a and the second outer peripheral edge 114a, and the first reflecting surface 116 is a curved surface constructed by a first profile curve B1. The first profile curve B1 is a connecting line from a first initial point on the first outer peripheral edge 112a to a first terminating point on the second outer peripheral edge 114a. It is noted that the first profile curve B1 in the present embodiment is a curve of intersection between the first reflecting surface 116 and any cut plane which is perpendicular to the light-incident surface 112 and passes through a center of the light guide element 100. The second reflecting surface 118 connects the first inner peripheral edge 112b and the second inner peripheral edge 114b, and the second reflecting surface 118 is a curved surface constructed by a second profile curve B2. The second profile curve B2 is a connecting line from a second initial point on the first inner peripheral edge 112*b* to a second terminating point on the second inner peripheral edge 114*b*. Similarly, the second profile curve B2 in the present embodiment is a curve of intersection between the second reflecting surface 118 and any cut plane which is perpendicular to the light-incident surface 112 and passes through the center of the light guide element 100.

In one embodiment, the first profile curve B1 is defined by a Bezier curve function. Bezier curves are various curves illustrated mainly by using three or more points of position coordinates with different weights according to the Bezier curve function. The Bezier curve function is shown as $$B(t) = \frac{\sum_{i=0}^{n} \binom{n}{i} t^i (1-t)^{n-i} P_i W_i}{\sum_{i=0}^{n} \binom{n}{i} t^i (1-t)^{n-i} W_i} \quad (1)$$

where "$P_i$" represents a position coordinate of an $i^{th}$ point in the Bezier curve function. In the present embodiment, there is at least one first control point between the first initial point and the first terminating point. For example, when a total number of the at least one first control point is one, the first control point $P_1$ is located between the first initial point $P_0$ and the first terminating point $P_2$. The position of the first control point is mainly used for determining a radian of the first profile curve B1. For example, when a total number of the at least one first control point is one, a position coordinate of the first initial point $P_0$ is $(X_0, Y_0)$, a position coordinate of the first control point $P_1$ is $(X_1, Y_1)$, and a position coordinate of the first terminating point $P_2$ is $(X_2, Y_2)$. In the Bezier curve function, "n" represents the total number of the at least one first control point plus 1, and "$W_i$" represents a weight of a point $P_i$. For example, when the total number of the at least one first control point is 2, "n" is 3. In addition, "$W_1$" represents a weight of the first control point $P_1$ which can adjust the shape of the first profile curve B1. As shown in FIG. 1B, the weight $W_1$ in a connecting line from the first initial point $P_0$ to the first control point $P_1$ is defined as 1, and the weight $W_1$ in a connecting line from the first initial point $P_0$ to the first terminating point $P_2$ is defined as 0. If the weight of the first control point $P_1$ approaches 1, the first profile curve B1 will trend to the connecting line from the first initial point $P_0$ to the first control point $P_1$. Similarly, if the weight of the first control point $P_1$ approaches 0, the first profile curve B1 will trend to the connecting line from the first initial point $P_0$ to the first terminating point $P_2$. In the Bezier curve function, "t" represents a ratio of a length between a predetermined point and the first initial point to a total length of the first profile curve B1. The aforementioned "total length" is a length of the connecting line from the first initial point to the first terminating point. Therefore, "t" may represent a corresponding value of a position of any point on the first profile curve B1 between the first initial point and the first terminating point.

After the first initial point $P_0$, the first control point $P_1$ and the first terminating point $P_2$ are defined, the first profile curve B1 are further defined by constraints shown as:

$$X_0 \leq X_1 \leq X_2; \quad (2)$$
$$90° \geq \alpha_1 \geq \alpha_2;$$
$$0 \leq \alpha_1 = \theta_1 + \theta_2 - 90°;$$
$$\theta_1 = \sin^{-1}\left(\frac{1}{n_{material}}\right);$$
$$\theta_2 \geq 90° - \theta_1; \text{ and}$$
$$0 \leq W_i \leq 1.$$

Referring to FIG. 1B again, $\alpha_1$ represents an angle included between a horizontal line and the connecting line from the first initial point $P_0$ to the first control point $P_1$. $\alpha_2$ represents an angle included between a horizontal line and the connecting line from the first initial point $P_0$ to the first terminating point $P_2$. $\theta_1$ represents a refracting angle of the light beam entering from outside of the light guide element 100. $\theta_2$ represents an incident angle of the light beam which is incident toward the first reflecting surface 116 after entering the light guide element 100. $n_{material}$ represents a refractive index of the light guide element 100. Therefore, adjusting each parameter value of the constraints may change the shape of the first reflecting surface 116.

Referring to FIGS. 1A and 1B again, in one embodiment, the second profile curve B2 may be the same curve as the first profile curve B1. Both the first profile curve B1 and the second profile curve B2 are defined by the aforementioned Bezier curve function. For clarity of explanation, $P'_i$, $X'_i$ and $Y'_i$ are used below to represent $P_i$, $X_i$, and $Y_i$ in equations (1) and (2).

In the present embodiment, there is at least one second control point between the second initial point and the second terminating point. For example, when a total number of the at least one first control point is one, the second control point $P'_1$ is located between the second initial point $P'_0$ and the second terminating point $P'_2$. The position of the second control point is mainly used for determining a radian of the second profile curve B2. For example, when a total number of the at least one second control point is one, a position coordinate of the second initial point $P'_0$ is $(X'_0, Y'_0)$, a position coordinate of the second control point $P'_1$ is $(X'_1, Y'_1)$, and a position coordinate of the second terminating point $P'_2$ is $(X'_2, Y'_2)$. In the Bezier curve function, "n" represents the total number of the at least one second control point plus 1. In addition, "$W_i$" represents a weight of the second control point $P'_i$ which can adjust the shape of the second profile curve B2. As shown in FIG. 1B, the weight $W_1$ in a connecting line from the second initial point $P'_0$ to the second control point $P'_1$ is defined as 1, and the weight $W_1$ in a connecting line from the second initial point. $P'_0$ to the second terminating point $P'_2$ is defined as 0. If the weight of the second control point $P'_1$ approaches 1, the second profile curve B2 will trend to the connecting line from the second initial point $P'_0$ to the second control point $P'_1$. Similarly, if the weight of the second control point $P'_1$ approaches 0, the second profile curve B2 will trend to the connecting line from the second initial point $P'_0$ to the second terminating point $P'_2$. In the Bezier curve function, "t" represents a ratio of a length between a predetermined point and the second initial point to a total length of the second profile curve B2. The aforementioned "total length" is a length of the connecting line from the second initial point to the second terminating point. Therefore, "t" may represent a corresponding value of a position of any point on the second profile curve B2 between the second initial point and the second terminating point.

After the second initial point P'$_0$, the second control point P'$_1$ and the second terminating point P'$_2$, are defined, the second profile curve B2 are further defined by constraints shown as:

$$X'_0 \leq X'_1 \leq X'_2; \quad (3)$$

$$90° \geq \alpha'_1 \geq \alpha'_2;$$

$$0 \leq \alpha'_1 = \theta'_1 + \theta'_2 - 90°;$$

$$\theta'_1 = \sin^{-1}\left(\frac{1}{n_{material}}\right);$$

$$\theta'_2 \geq 90° - \theta'_1; \text{ and}$$

$$0 \leq W_i \leq 1.$$

Referring to FIG. 1B again, α$_1$' represents an angle included between a horizontal line and the connecting line from the second initial point P$_0$' to the first control point P'$_1$. α$_2$' represents an angle included between a horizontal line and the connecting line from the second initial point P'$_0$ to the second terminating point P'$_2$. θ$_1$' represents a refracting angle of the light beam entering from outside of the light guide element 100. θ$_2$' represents an incident angle of the light beam which, is incident toward the second reflecting surface 118 after entering the light guide element 100. n$_{material}$ represents a refractive index of the light guide element 100. Therefore, adjusting each parameter value of the constraints may change the shape of the second reflecting surface 118.

It can be known from the above descriptions that, the second profile curve B2 is defined by the same Bezier curve function and the same constraints for the first profile curve B1. Therefore, in one embodiment, the second profile curve B2 and the first profile curve B1 can have the same profile, so that the second reflecting surface 118 and the first reflecting surface 116 are symmetrical. However, in another embodiment, the second profile curve B2 and the first profile curve B1 may have different profiles defined by different parameter values, so that the second reflecting surface 118 and the first reflecting surface 116 are not symmetrical.

Figure 2A:
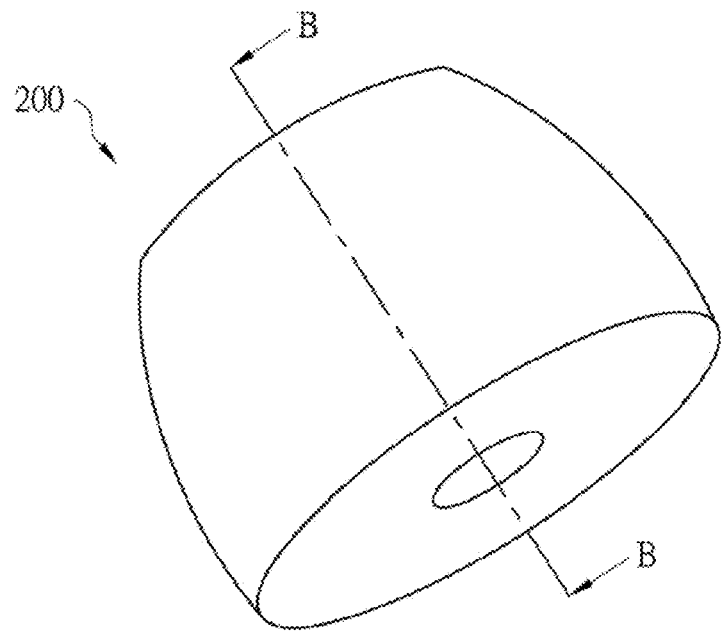
FIG. 2A is a schematic structural diagram showing a light guide element in accordance with a second embodiment of the present invention.
Figure 2B:
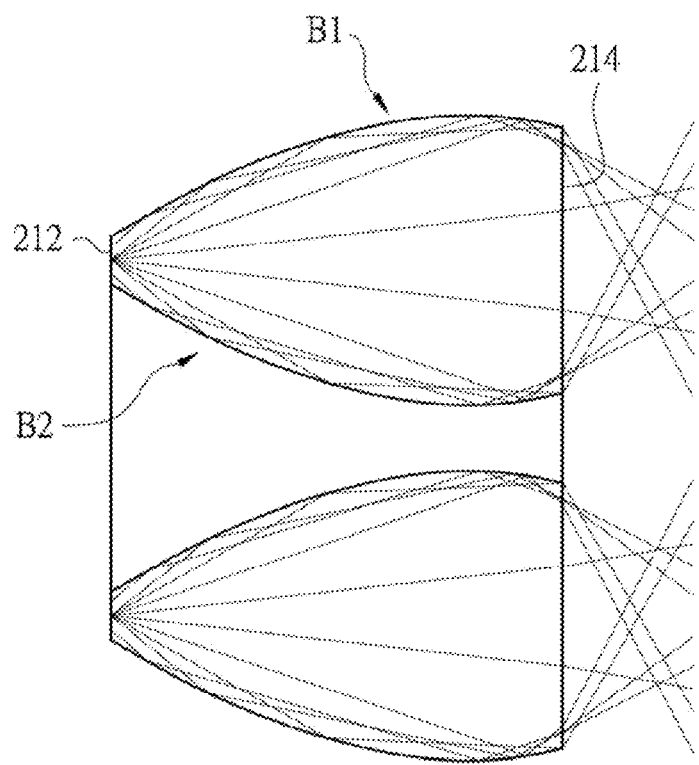
FIG. 2B is a schematic cross-sectional view of the light guide element viewed along a line B-B in FIG. 2A.
Figure 2C:
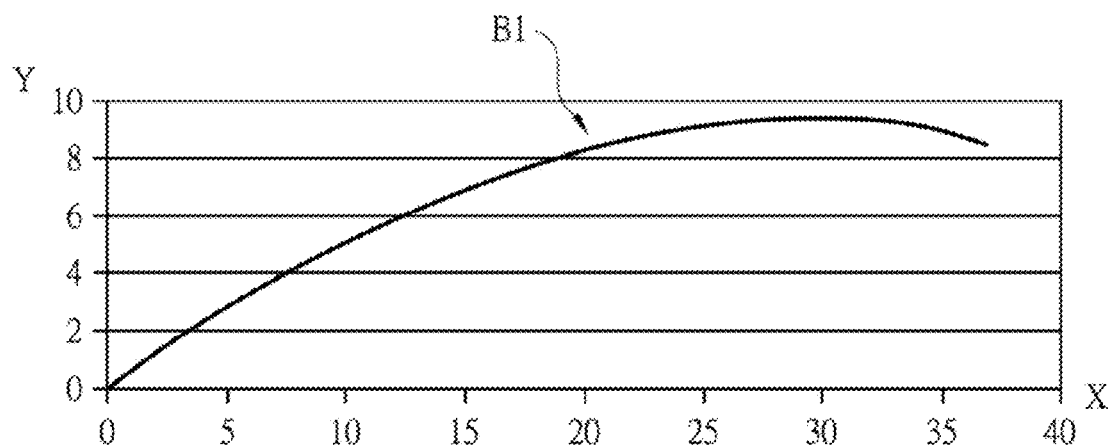
FIG. 2C is a schematic diagram of a first profile curve in accordance with the second embodiment of the present invention.
Figure 2D:
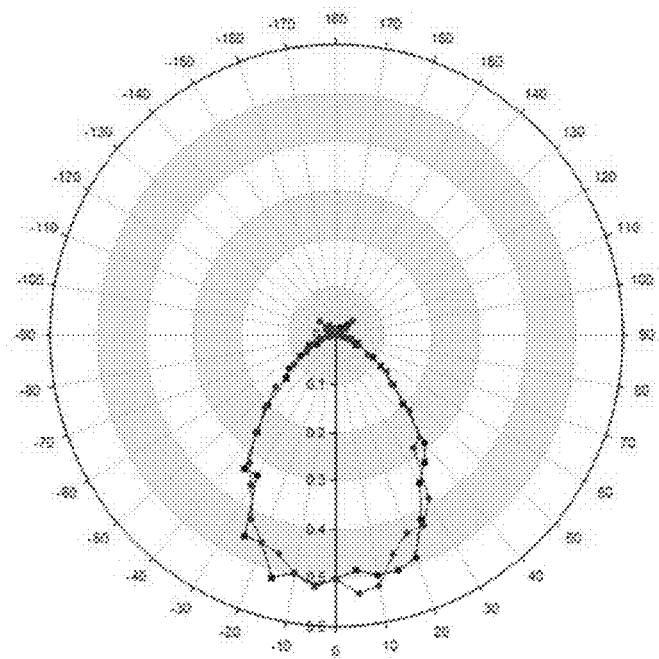
FIG. 2D is a candlepower distribution curve generated from the light guide element in accordance with the second embodiment of the present invention.

Referring to FIG. 2A to FIG. 2D, FIG. 2A is a schematic structural diagram a light guide element 200 in accordance with a second embodiment of the present invention; FIG. 2B is a schematic cross-sectional view of the light guide element 200 viewed along a line B-B in FIG. 2A; FIG. 2C is a schematic diagram of a first profile curve in accordance with the second embodiment of the present invention; and FIG. 2D is a candlepower distribution curve generated from the light guide element in accordance with the second embodiment of the present invention.

In the second embodiment, as shown in FIG. 2C, the first profile curve B1 of the light guide element 200 is formed from the parameter values which are P$_0$=(0,0), P$_1$=(21.3,13), P$_2$=(36,8.5) and W$_1$=0.45. The second profile curve B2 and the first profile curve B1 are symmetrical. As shown in FIG. 2B, the light beam enters the light guide element 200 from a light-incident surface 212, and is reflected out of the light-emitting surface 214 by the light guide element 200. In the present embodiment, the light beam is emitted from the light guide element 200 at a light beam angle of about 82 degrees.

Figure 3A:
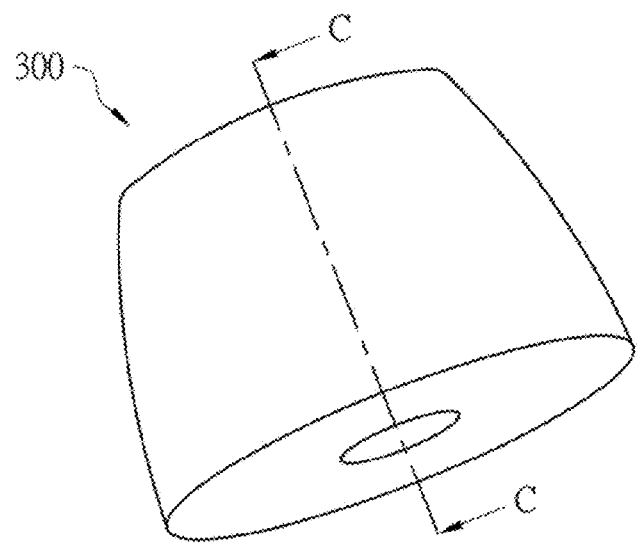
FIG. 3A is a schematic structural diagram showing a light guide element in accordance with a third embodiment of the present invention.
Figure 3B:
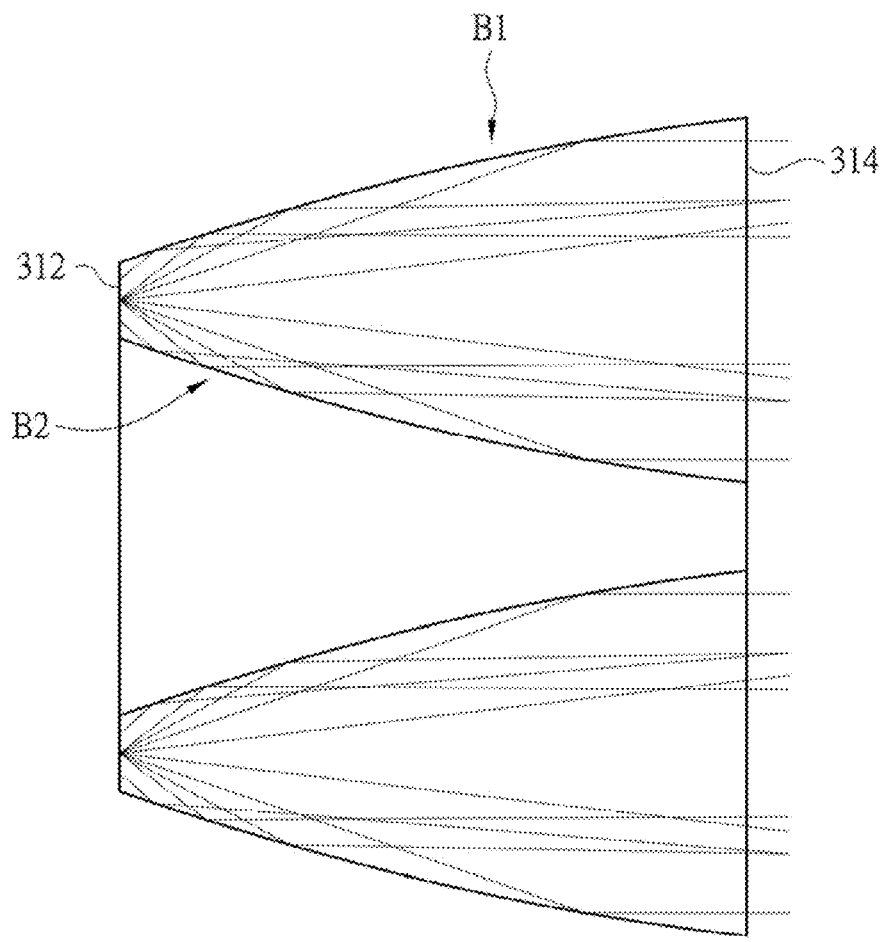
FIG. 3B is a schematic cross-sectional view of the light guide element viewed along a line C-C in FIG. 3A.
Figure 3C:
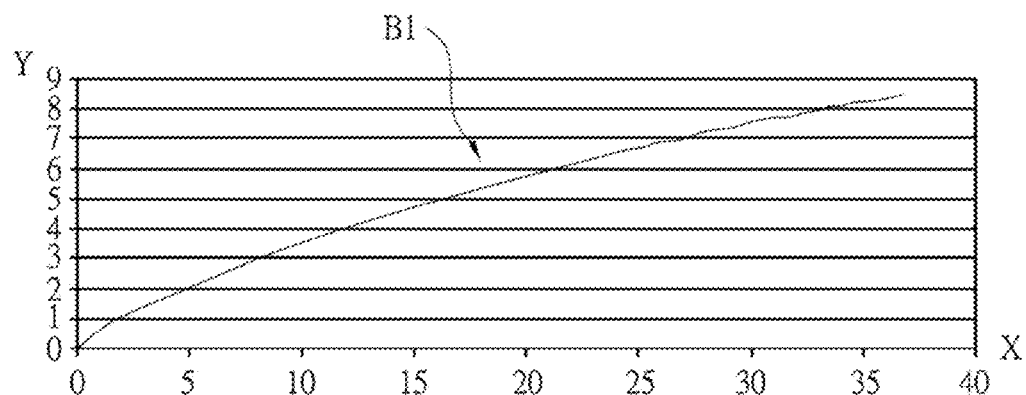
FIG. 3C is a schematic diagram of a first profile curve in accordance with the third embodiment of the present invention.
Figure 3D:
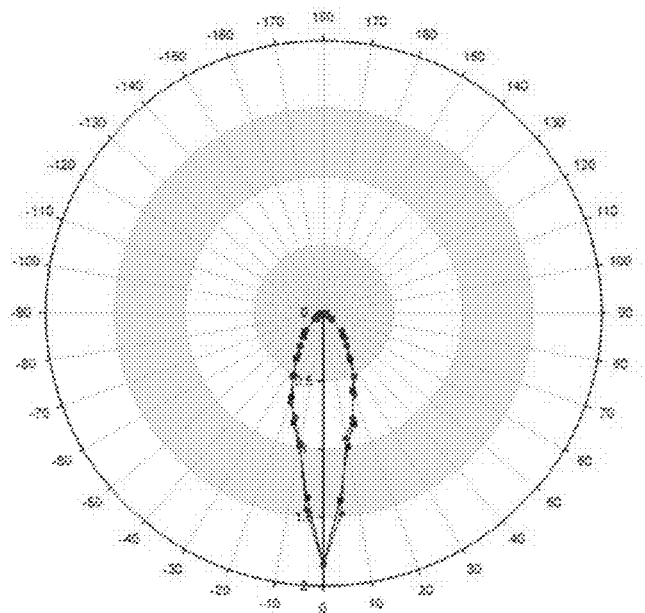
FIG. 3D is a candlepower distribution curve generated from the light guide element in accordance with the third embodiment of the present invention.

Referring to FIG. 3A to FIG. 3D, FIG. 3A is a schematic structural diagram of a light guide element 300 in accordance with a third embodiment of the present invention; FIG. 3B is a schematic cross-sectional view of the light guide element 300 viewed along a line C-C in FIG. 3A; FIG. 3C is a schematic diagram of a first profile curve in accordance with the third embodiment of the present invention; and FIG. 3D is a candlepower distribution curve generated from the light guide element in accordance with the third embodiment of the present invention.

In the third embodiment, as shown in FIG. 3C, the first profile curve B1 of the light guide element 300 is formed from the parameter values which are P$_0$=(0,0), P$_1$=(7.6,4.6), P$_2$=(36,8.5) and W$_1$=0.45. The second profile curve B2 and the first profile curve B1 are symmetrical. As shown in FIG. 3B, the light beam enters the light guide element 300 from a light-incident surface 312, and is reflected out of the light-emitting surface 314 by the light guide element 300. In the present embodiment, the light beam is emitted from the light guide element 300 at a light beam angle of about 24 degrees.

Figure 4A:
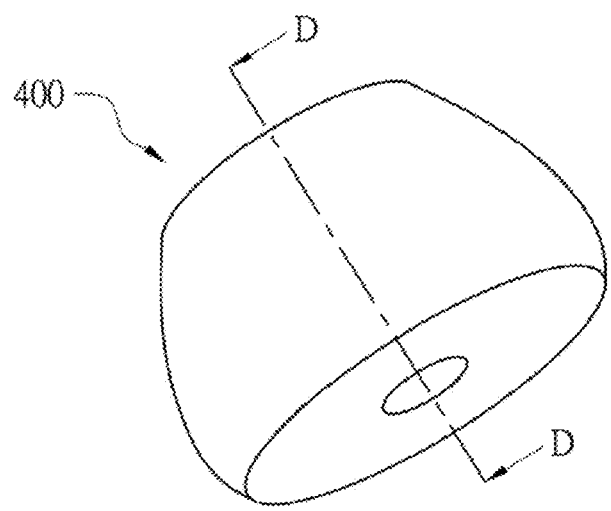
FIG. 4A is a schematic structural diagram showing a light guide element in accordance with a fourth embodiment of the present invention.
Figure 4B:
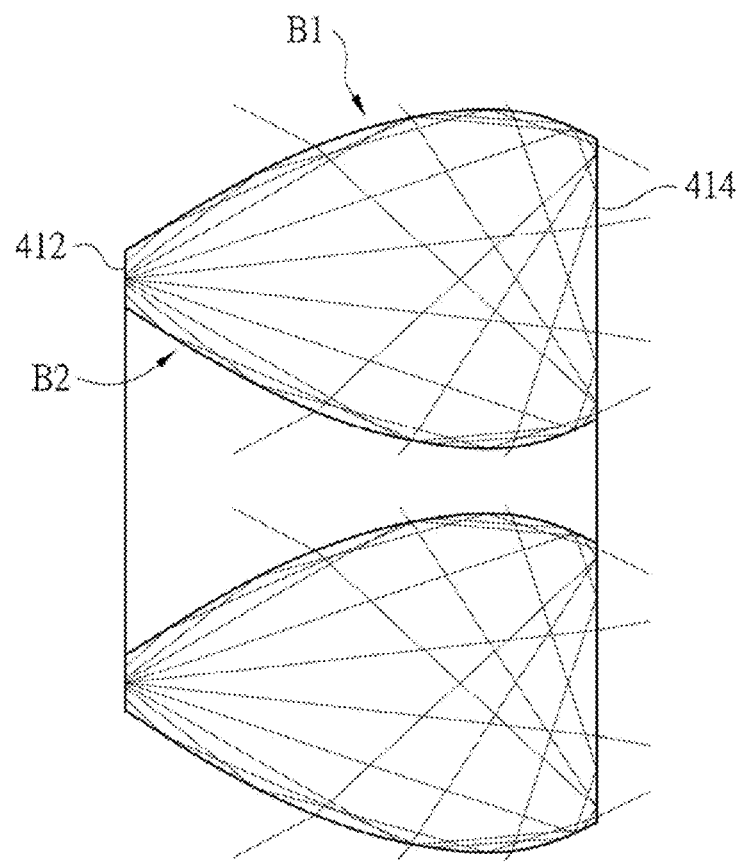
FIG. 4B is a schematic cross-sectional view of the light guide element viewed along a line D-D in FIG. 4A.
Figure 4C:
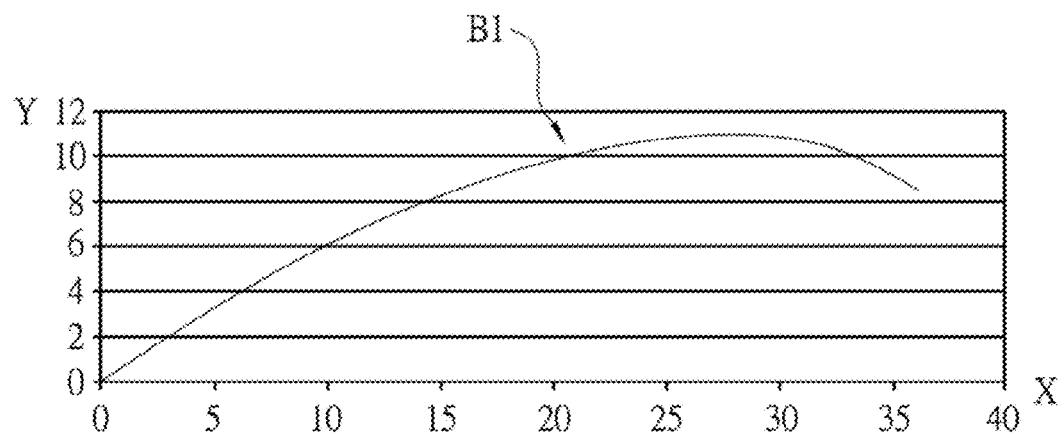
FIG. 4C is a schematic diagram of a first profile curve in accordance with the fourth embodiment of the present invention.
Figure 4D:
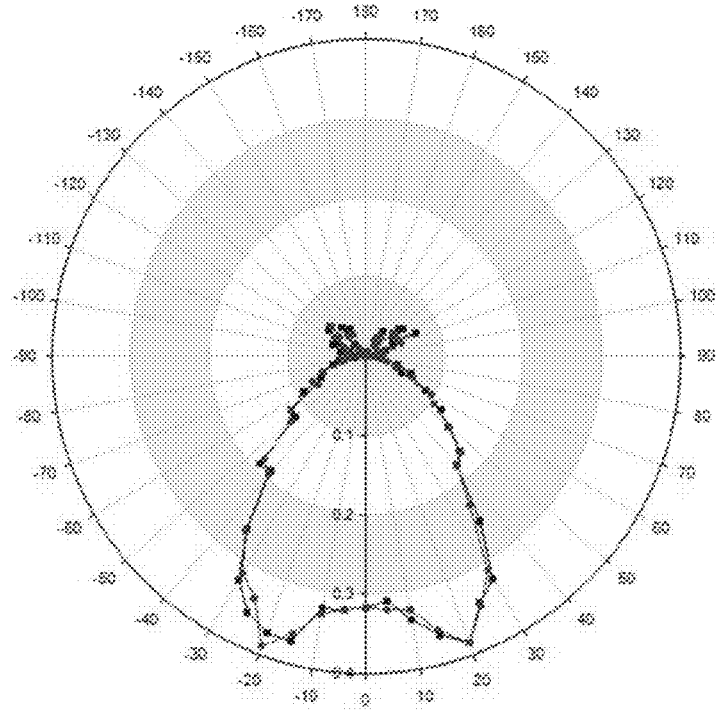
FIG. 4D is a candlepower distribution curve generated from the light guide element in accordance with the fourth embodiment of the present invention.

Referring to FIG. 4A to FIG. 4D FIG. 4A is a schematic structural diagram of a light guide element 400 in accordance with a fourth embodiment of the present invention; FIG. 4B is a schematic cross-sectional view of the light guide element 400 viewed along a line D-D in FIG. 4A; FIG. 4C is a schematic diagram of a first profile curve in accordance with the fourth embodiment of the present invention; and FIG. 4D is a candlepower distribution curve generated from the light guide element in accordance with the fourth embodiment of the present invention.

In the fourth embodiment, as shown in FIG. 4C, the first profile curve B1 of the light guide element 400 is formed from the parameter values which are P$_0$=(0,0), P$_1$=(24.6, 17.2), P$_2$=(36,8.5) and W$_1$=0.45. The second profile curve B2 and the first profile curve B1 are symmetrical. As shown in FIG. 4B, the light beam enters the light guide element 400 from a light-incident surface 412, and is reflected out of the light-emitting surface 414 by the light guide element 400. In the present embodiment, the light beam is emitted from the light guide element 400 at a light beam angle of about 93 degrees.

Figure 5A:
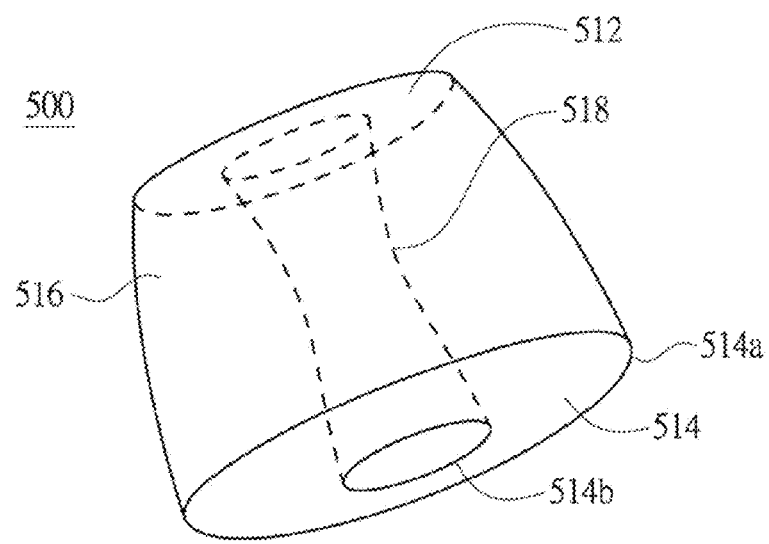
FIG. 5A is a schematic structural diagram showing a light guide element in accordance with a fifth embodiment of the present invention.
Figure 5B:
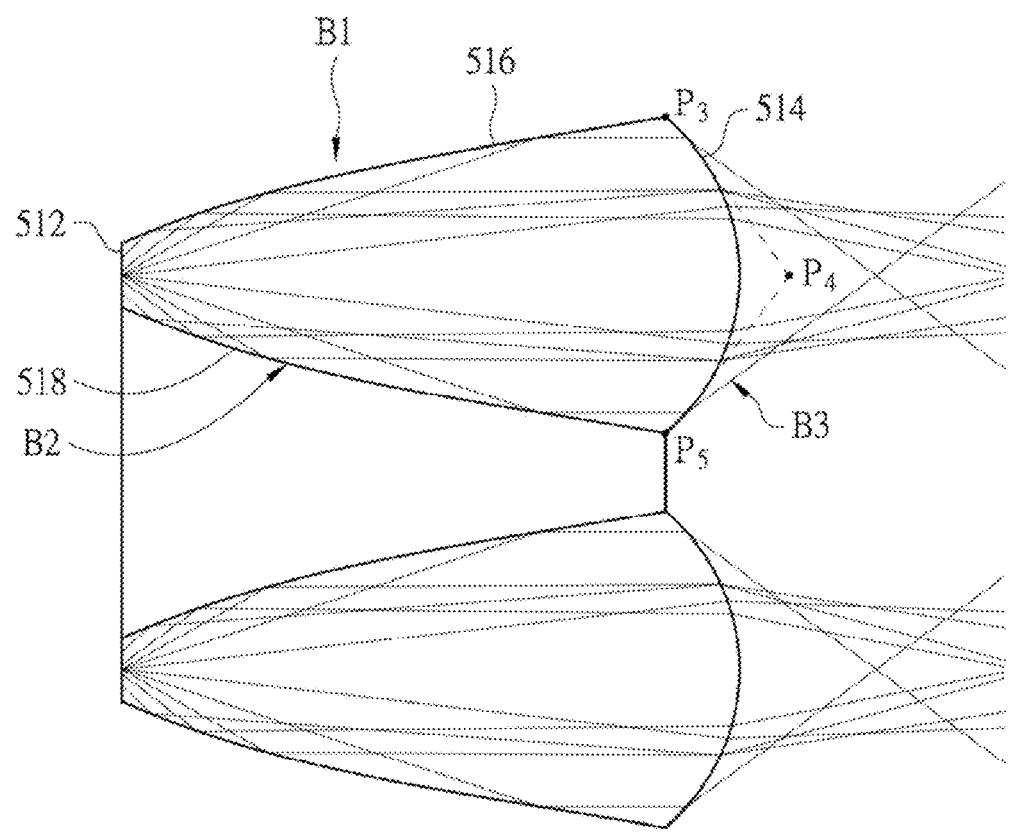
FIG. 5B is a schematic cross-sectional view of the light guide element viewed along a line E-E of FIG. 5A.
Figure 5C:
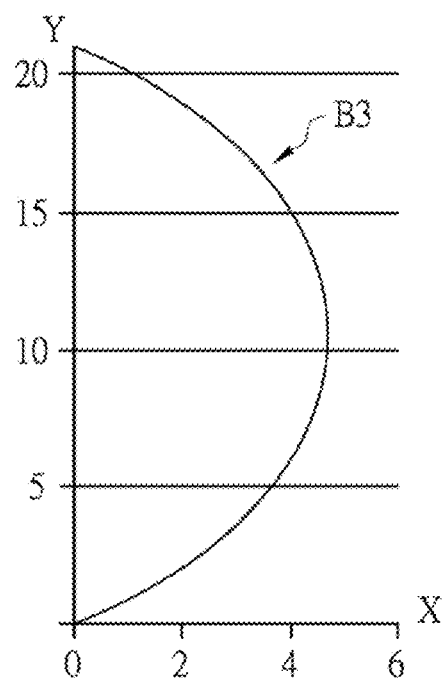
FIG. 5C is a schematic diagram of a first profile curve in accordance with the fifth embodiment of the present invention.
Figure 5D:
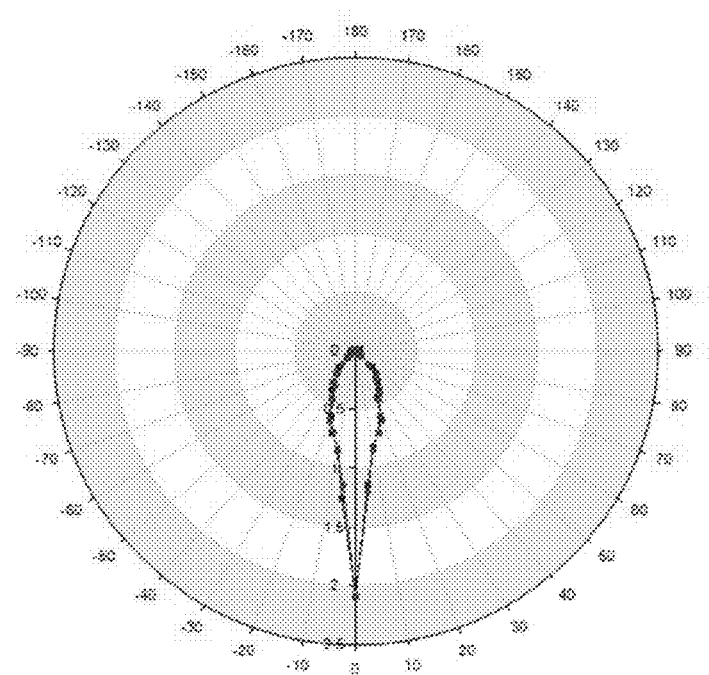
FIG. 5D is a candlepower distribution curve generated from the light guide element in accordance with the fifth embodiment of the present invention.

Referring to FIG. 5A to FIG. 5D, FIG. 5A is a schematic structural diagram of a light guide element 500 in accordance with a fifth embodiment of the present invention; FIG. 5B is a schematic cross-sectional view of the light guide element 500 viewed along a line E-E in FIG. 5A; FIG. 5C is a schematic diagram of a first profile curve in accordance with the fifth embodiment of the present invention; and FIG. 5D is a candlepower distribution curve generated from the light guide element in accordance with the fifth embodiment of the present invention.

In the fifth embodiment, the light guide element 500 is similar to the light guide element 100. The light guide element 500 includes a light-incident surface 512, a light-emitting surface 514, a first reflecting surface 516 and a second reflecting surface 518. The first reflecting surface 516 and the second reflecting surface 518 are similar to the first reflecting surface 116 and the second reflecting surface 118. The first reflecting surface 516 and the second reflecting surface 518 are constructed by the same first profile curve B1 and the same second profile curve B2 which are described before, and will not be repeated herein. In the present embodiment, the light-emitting surface 514 has an outer peripheral edge 514a and an inner peripheral edge 514b. The light-emitting surface 514 is constructed by a third profile curve B3. The third profile curve B3 is a connecting line from a third initial point on the outer peripheral edge 514a to a third terminating point on the inner peripheral edge 514b.

It is noted that the third profile curve B3 in the present embodiment is a curve of intersection between the light-emitting surface 514 and any cut plane which is perpendicular to the light-incident surface 512 and passes through a center of the light guide element 500. In one embodiment, the third profile curve B3 and the first profile curve B1 may be defined by the same profile curve. Both the first profile curve B1 and the third profile curve B3 are defined by the aforementioned Bezier curve function.

In the present embodiment, there is at least one third control point between the third initial point and the third terminating point. For example, when a total number of the at least one third control point is one, the third control point $P_4$ is located between the third initial point $P_3$ and the third terminating point $P_5$. The position of the third control point is mainly used for determining a radian of the third profile curve B3. For example, when a total number of the at least one third control point is one, a position coordinate of the third initial point $P_3$ is $(X_3,Y_3)$, a position coordinate of the third control point $P_4$ is $(X_4,Y_4)$, and a position coordinate of the third terminating point $P_5$ is $(X_5,Y_5)$. In the Bezier curve function, the definition of "$P_i$", "n", "$W_i$" and "t" are described in the above descriptions, and will not be described again. After the third initial point $P_3$, the third control point $P_4$ and the third terminating point $P_5$ are defined, the third profile curve B3 are further defined by constraints shown as $X_3=X_5$; $Y_3 \geq Y_4 \geq Y_5$; and $0 \geq W_i \geq 1$.

Referring to FIG. 5A to FIG. 5D again, in the fifth embodiment, the first profile curve B1 and the second profile curve B2 are formed from the same parameter values of the third embodiment, i.e. $P_0=(0,0)$, $P_1=(7.6,4.6)$, $P_2=(36,8.5)$ and $W_1=0.45$. As shown in FIG. 5C, the third profile curve B3 of the light guide element 500 is formed from the parameter values which are $P_3=(0,21)$, $P_4=(10.6,10.6)$, $P_5=(0,0)$ and $W_4=0.45$. As shown in FIG. 5B, the light beam enters the light guide element 500 from a light-incident surface 512, and is reflected out of the light-emitting surface 514 by the light guide element 500. In the present embodiment, the light beam is emitted from the light guide element 500 at a light beam angle of about 13 degrees. Therefore, from the first embodiment to the fifth embodiment above, adjusting each parameter value of the constraints may change the shape of the light-emitting surface 514.

Figure 6A:
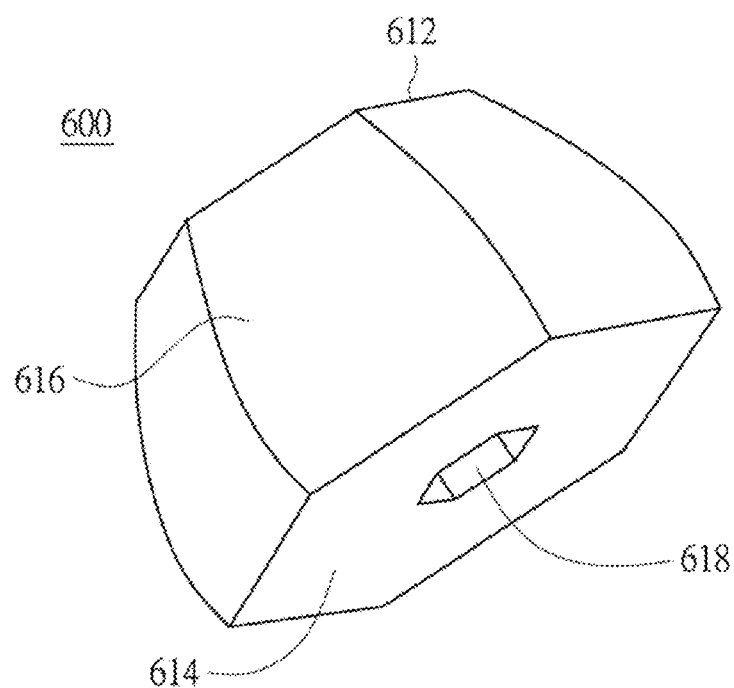
FIG. 6A is a schematic structural diagram showing a light guide element in accordance with a first example of a sixth embodiment of the present invention.
Figure 6B:
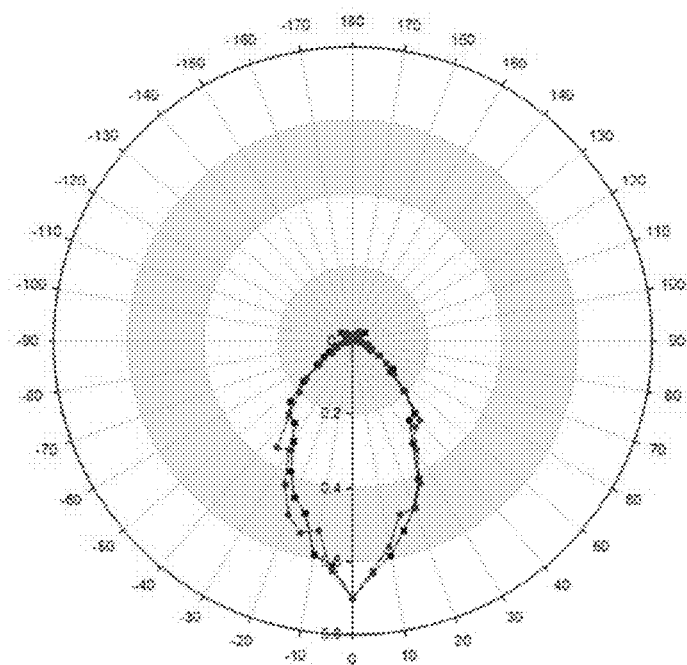
FIG. 6B is a candlepower distribution curve generated from the light guide element in accordance with the first example of the sixth embodiment of the present invention.

Referring to FIG. 6A and FIG. 6B, FIG. 6A is a schematic structural diagram a light guide element 600 in accordance with a first example of a sixth embodiment of the present invention; and FIG. 6B is a candlepower distribution curve generated from the light guide element 600 in accordance with the first example of the sixth embodiment of the present invention. In the present embodiment, the light guide element 600 includes a light-incident surface 612, a light-emitting surface 614, a first reflecting surface 616 and a second reflecting surface 618. The first reflecting surface 616 is formed from six first reflecting curved surfaces. Each of these first reflecting curved surfaces is constructed by the first profile curve B1. Similarly, the second reflecting surface 618 is formed from six second reflecting curved surfaces. Each of these second reflecting curved surfaces is constructed by the second profile curve B2.

Figure 7A:
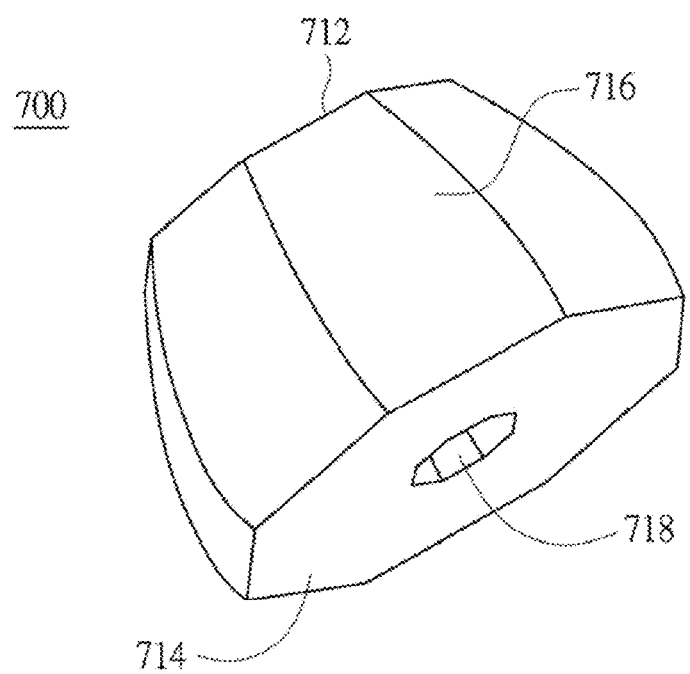
FIG. 7A is a schematic structural diagram showing a light guide element in accordance with a second example of the sixth embodiment of the present invention.
Figure 7B:
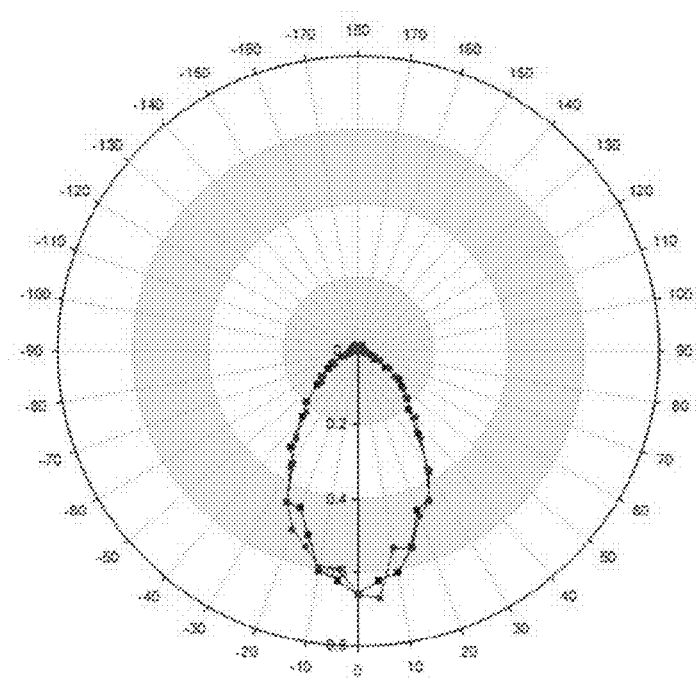
FIG. 7B is a candlepower distribution curve generated from the light guide element in accordance with the second example of the sixth embodiment of the present invention.

Referring to FIG. 7A and FIG. 7B, FIG. 7A is a schematic structural diagram a light guide element 700 in accordance with a second example of the sixth embodiment of the present invention; and FIG. 7B is a candlepower distribution curve generated from the light guide element 700 in accordance with the second example of the sixth embodiment of the present invention. In the present embodiment, the light guide element 700 includes a light-incident surface 712, a light-emitting surface 714, a first reflecting surface 716 and a second reflecting surface 718. The first reflecting surface 716 is formed from eight first reflecting curved surfaces. Each of these first reflecting curved surfaces is constructed by the first profile curve B1. Similarly, the second reflecting surface 618 is formed from eight second reflecting curved surfaces. Each of these second reflecting curved surfaces is constructed by the second profile curve B2.

Figure 8A:
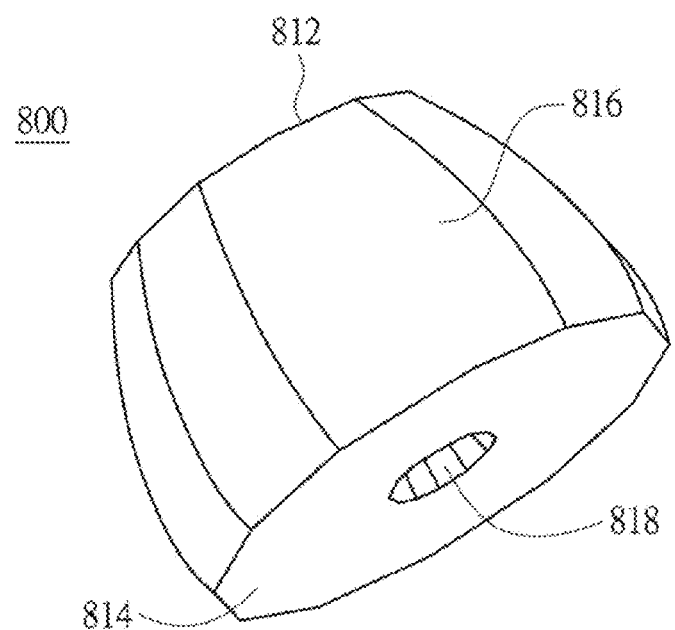
FIG. 8A is a schematic structural diagram showing a light guide element in accordance with a third example of the sixth embodiment of the present invention.
Figure 8B:
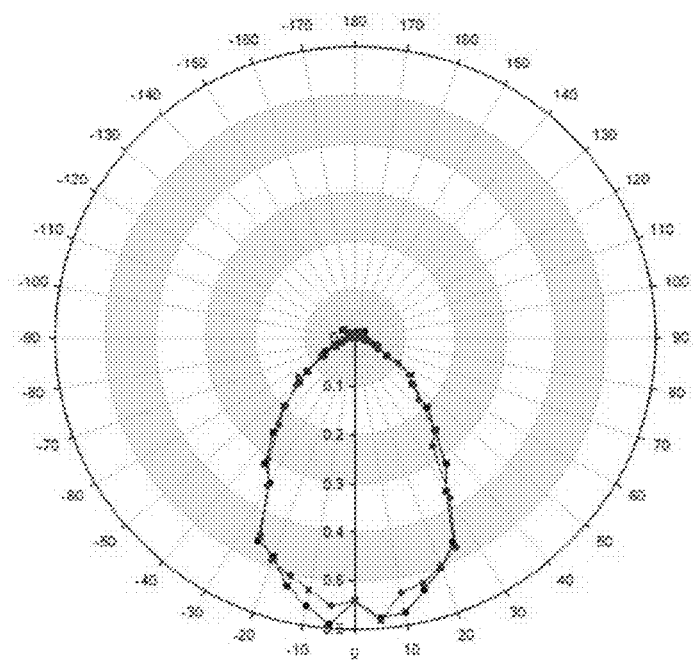
FIG. 8B is a candlepower distribution curve generated from the light guide element in accordance with the third example of the sixth embodiment of the present invention.

Referring to FIG. 8A and FIG. 8B, FIG. 8A is a schematic structural diagram of a light guide element 800 in accordance with a third example of the sixth embodiment of the present invention; and FIG. 8B is a candlepower distribution curve generated from the light guide element 800 in accordance with the third example of the sixth embodiment of the present invention. In the present embodiment, the light guide element 800 includes a light-incident surface 812, a light-emitting surface 814, a first reflecting surface 816 and a second reflecting surface 818. The first reflecting surface 816 is formed from twelve first reflecting curved surfaces Each of these first reflecting curved surfaces is constructed by the first profile curve B1. Similarly, the second reflecting surface 618 is formed from twelve second reflecting curved surfaces. Each of these second reflecting curved surfaces is constructed by the second profile curve B2.

From the above, different shapes of the light guide elements, such as light guide element 600, 700 and 800 may form different light beam angles. It is noted that the number of the first reflecting curved surfaces and the second reflecting curved surfaces are described the same, it is possible to utilize different number of the first reflecting curved surfaces and the second reflecting curved surfaces. Additionally, the first profile curve B1 and the second profile curve B2 may be defined by the same profile curve or different profile curves. The following examples are directed to other modifications of the light guide element 600 of the sixth embodiment.

Figure 9A:
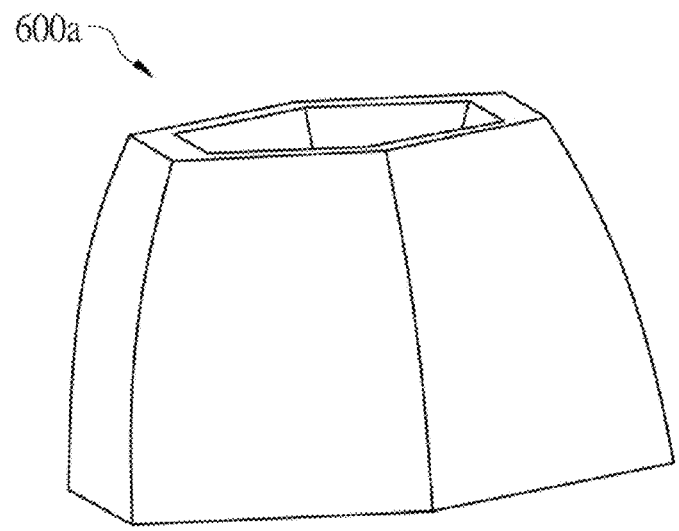
FIG. 9A is a schematic structural diagram showing a light guide element in accordance with a fourth example of the sixth embodiment of the present invention.
Figure 9B:
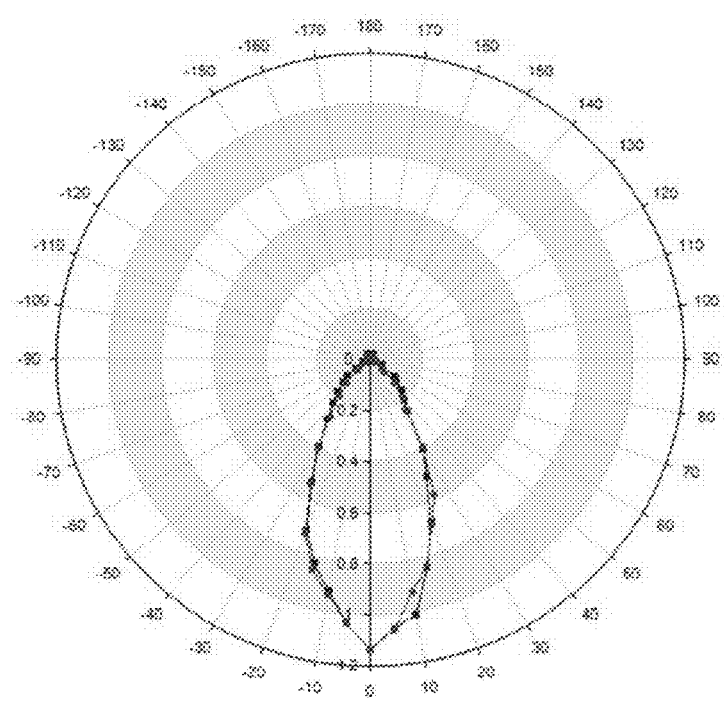
FIG. 9B is a candlepower distribution curve generated from the light guide element in accordance with the fourth example of the sixth embodiment of the present invention.

Referring to FIG. 9A and FIG. 9B, FIG. 9A is a schematic structural diagram of a light guide element 600a in accordance with a fourth example of the sixth embodiment of the present invention; and FIG. 9B is a candlepower distribution curve generated from the light guide element 600a in accordance with the fourth example of the sixth embodiment of the present invention. In the present embodiment, the first profile curve B1 of the light guide element 600a is formed from the parameter values which are $P_0=(0,0)$, $P_1=(10.3,6.2)$, $P_2=(36,8.5)$ and $W_1=0.45$. The second profile curve B2 and the first profile curve B1 are symmetrical. In the present embodiment, the light beam is emitted from the light guide element 600a at a light beam angle of about 47 degrees.

Figure 10A:
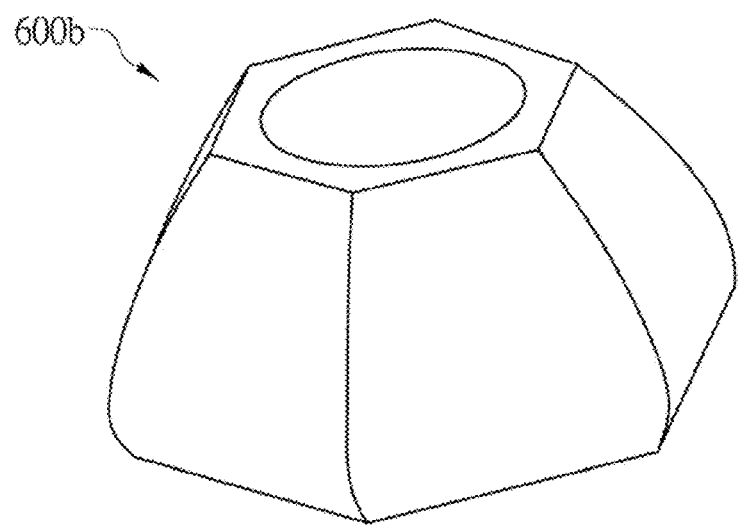
FIG. 10A is a schematic structural diagram showing a light guide element in accordance with a fifth example of the sixth embodiment of the present invention.
Figure 10B:
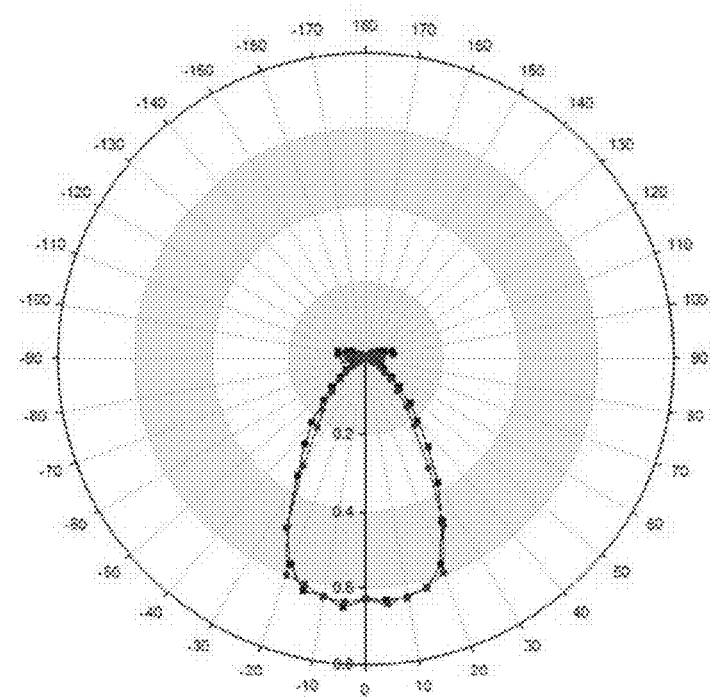
FIG. 10B is a candlepower distribution curve generated from the light guide element in accordance with the fifth example of the sixth embodiment of the present invention.

Referring to FIG. 10A and FIG. 10B, FIG. 10A is a schematic structural diagram of a light guide element 600b in accordance with a fifth example of the sixth embodiment of the present invention; and FIG. 10B is a candlepower distribution curve generated from the light guide element 600b in accordance with the fifth example of the sixth embodiment of the present invention. In the present embodiment, the first profile curve B1 of the light guide element 600b is formed from the parameter values which are $P_0=(0,0)$, $P_1=(32.8,22.9)$, $P_2=(36,8.5)$ and $W_1=0.45$. The second profile curve B2 is formed from the parameter values which are $P'_0=(0,0)$, $P'_1=(10,15)$, $P'_2=(36,8.5)$ and $W_1=0$. In the present embodiment, the light beam is emitted from the light guide element 600b at a light beam angle of about 63 degrees.

Figure 11A:
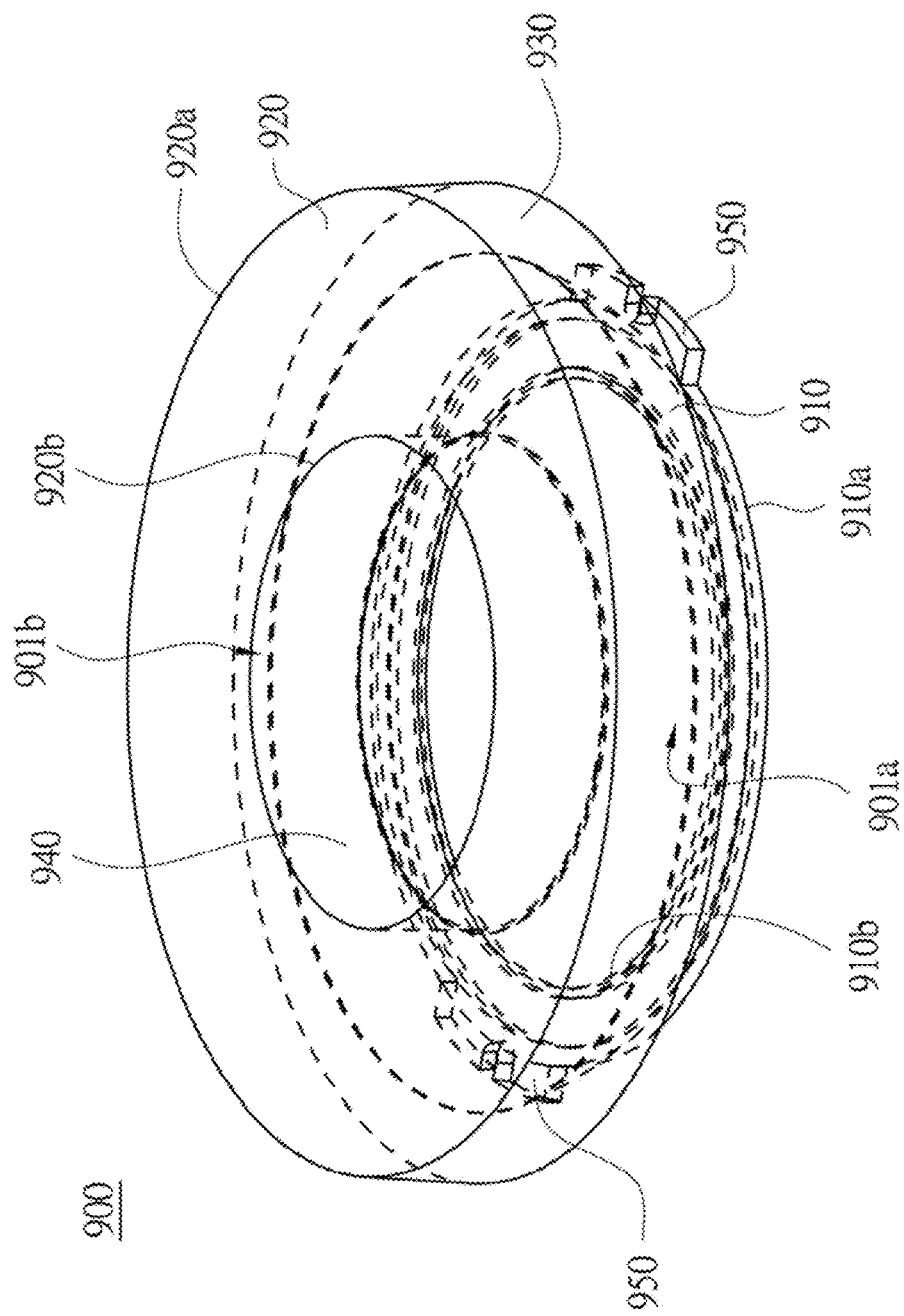
FIG. 11A is a schematic structural diagram showing a light guide element in accordance with a seventh embodiment of the present invention.
Figure 11B:
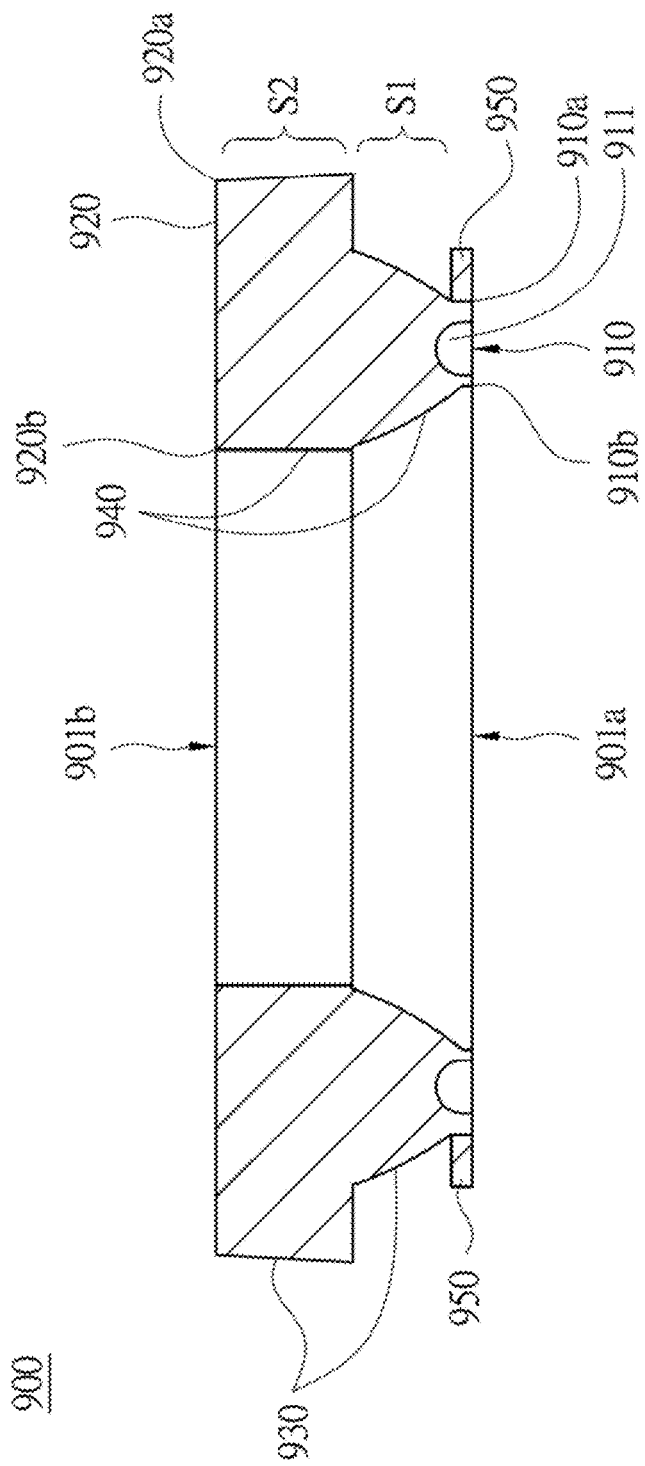
FIG. 11B is a schematic cross-sectional view showing the light guide element in accordance with the seventh embodiment of the present invention.

In the present invention, the aforementioned light guide elements may have different designs. Referring to FIG. 11A and FIG. 11B, FIG. 11A and FIG. 11B are a schematic structural diagram and a schematic cross-sectional view showing a light guide element 900 in accordance with a seventh embodiment of the present invention. The light guide element 900 is an annular frustum. The light guide element 900 includes a light-incident surface 910, a light-emitting surface 920, an outer surface 930 and an inner surface 940. The light-incident surface 910 has a first outer peripheral edge 910a and a first inner peripheral edge 910b. The light-emitting surface 920 is opposite to the light-incident surface 910 and has a second outer peripheral edge 920a and a second inner peripheral edge 920b.

As shown in FIG. 11A and FIG. 11B, the outer surface 930 connects the first outer peripheral edge 910a and the second outer peripheral edge 920a, and the inner surface 940 connects the first inner peripheral edge 910b and the second inner peripheral edge 920b. Therefore, a first opening 901a can be defined by the inner surface 940 adjacent to the first inner peripheral edge 910b and the first opening 901a is located at the light-incident surface 910. In addition, a second opening 901b can be defined by the inner surface 940 adjacent to the second inner peripheral edge 920b and the second opening 901b is located at the light-emitting surface 920. The first opening 901a is larger than the second opening 901b. In other words, a diameter of the first opening 901a is larger than that of the second opening 901b. In one embodiment, the light guide element 900 has an annular trench 911 which is disposed on the light-incident surface 910. The annular trench 911 can be used to accommodate a light source of a lamp.

Figure 12A:
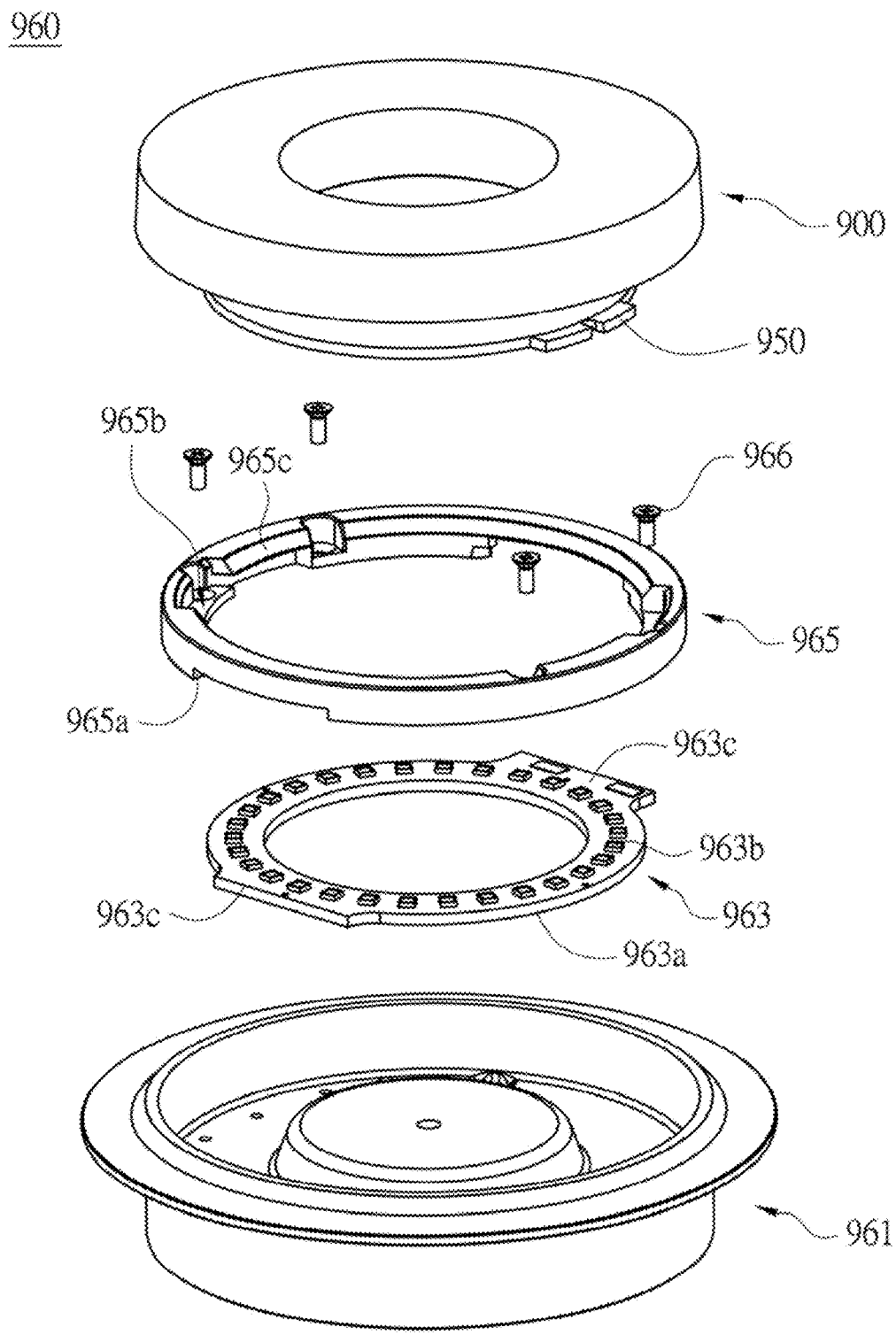
FIG. 12A is a schematic exploded view showing a lamp in accordance with an embodiment of the present invention.
Figure 12B:
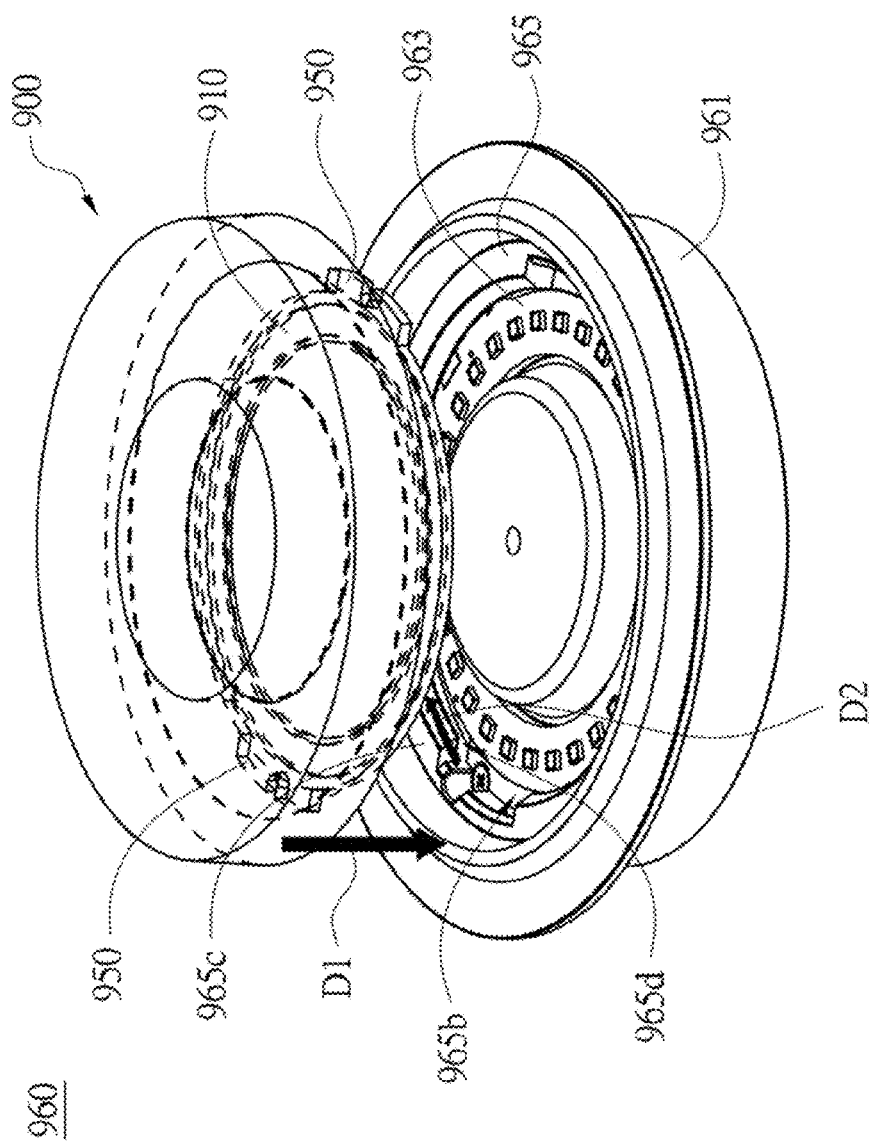
FIG. 12B is a schematic diagram showing a light guide element being engaged with a socket in accordance with the embodiment of the present invention.
Figure 12C:
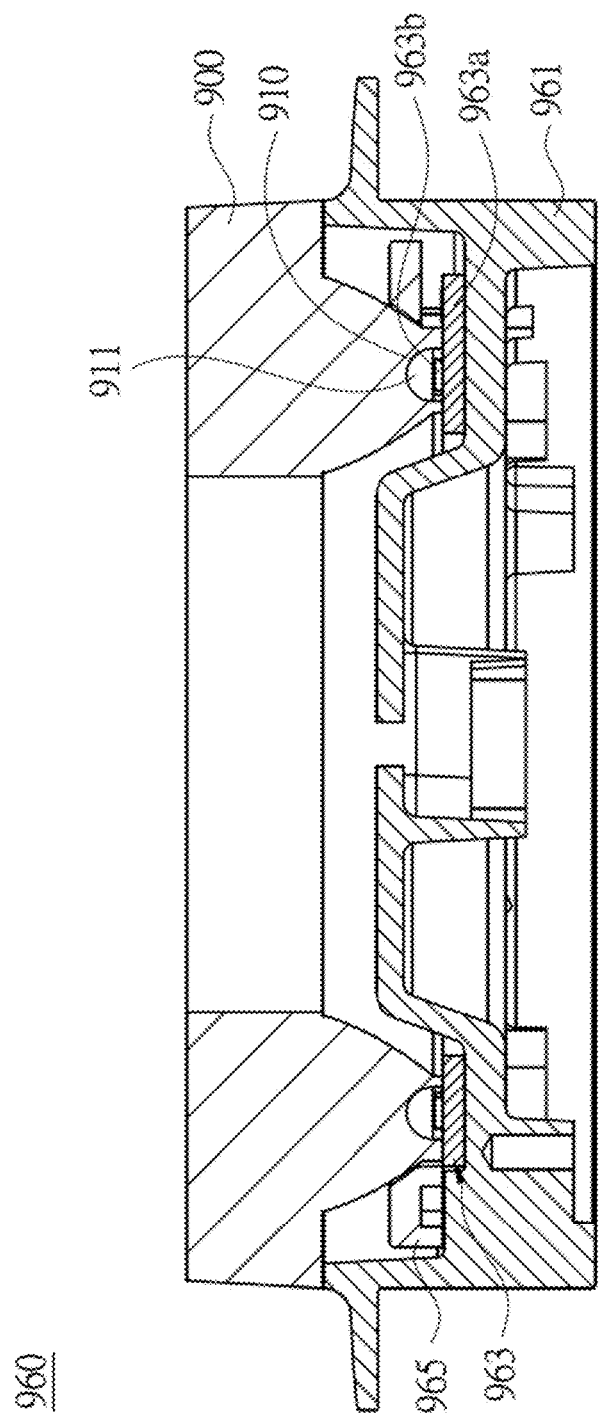
FIG. 12C is a cross-sectional view showing the lamp in accordance with the embodiment of the present invention.

Referring to FIG. 11A and FIG. 11B again, the light guide element 900 has a first segment S1 and a second segment S2. The first segment S1 has curvature. In other words, one or both of the outer surface 930 and the inner surface 940 of the first segment S1 can be annular curved surface. In one embodiment, the curved surface can also be defined by the aforementioned profile curves. The second segment S2 does not have curvature. In other words, both of the outer surface 930 and the inner surface 940 of the second segment S2 are annular flat surface. As shown in FIG. 11A and FIG. 11B the second segment S2 is more protruding than the first segment S1 so that a diameter of the second segment S2 is larger than that of the first segment S1. Referring to FIG. 12A-12C, in which FIG. 12A is a schematic exploded views showing a lamp 960 in accordance with an embodiment of the present invention, FIG. 12B is a schematic diagram showing the light guide element 900 being engaged with a socket in accordance with the embodiment of the present invention, and FIG. 12C is a cross-sectional view showing the lamp 960 in accordance with the embodiment of the present invention.

In the present invention, the lamp 960 includes a base 961, a light source 963, a socket 965 and the light guide element 900. The light source 963 is disposed on the base 961. In one embodiment, the light source 963 includes a circuit board 963a and plural light emitting diodes 963b disposed on the circuit board 963a, in which the circuit board 963a has a protruding portion 963c. The socket 965 is fixed on the base 961 by screwing members 966. As shown in FIG. 12A, the socket 965 has a notch 965a corresponding to the protruding portion 963c of the circuit board 963a, so that when the socket 965 is fixed on the base 961, the protruding portion 963c is positioned by the notch 965a, and the light source 963 can be fixed by the socket 965 accordingly.

Referring to FIG. 12A-12C again, the socket 965 further has a recess portion 965b and a flange 965c adjacent to the recess portion 965b. As shown in FIG. 12B, when the socket 965 is fixed on the base 961, an accommodating space 965d is formed between the flange 965c and the base 961. Moreover, the light guide element 900 includes a convex lug 950 adjacent to the light-incident surface 910. Therefore, the light guide element 900 can be first moved along a first direction D1 to put the convex lug 950 into the recess portion 965b of the socket 965, and then be rotated along a second direction D2 to move the convex lug 950 into the accommodating space 965d, thus engaging the light guide element 900 with the socket 965. As shown in FIG. 12C, when the light guide element 900 is engaged with the socket 965, the light emitting diodes 963b are located in the annular trench 911 of the light guide element 900, thereby emitting light towards the light-incident surface 910.

According to the aforementioned embodiments of the present invention, one advantage of the present invention is using profile curves to change curved surface shapes of a first reflecting surface, a second reflecting surface and a light-emitting surface of a light guide element, thereby adjusting a travel direction of the light beam in the light guide element to achieve an object of adjusting the light form emitted from the light guide element. Furthermore, by using a total reflection characteristic of the light beam to change a travel direction of the light beam can achieve an object of adjusting the light form emitted from the light guide element. Therefore, the applications of the light guide element may meet irradiation requirements of various light beam angles, and also reduce power consumption. Additionally, using the Bezier curve function to define respective profile curves can not only simplify definition rules of respective curved surfaces but also can control an overall profile shape of the light guide element in an intuitive manner.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of his invention provided they fall within the scope of the following claims.

What is claimed is:
1. A light guide element, comprising:
a light-incident surface having a first outer peripheral edge and a first inner peripheral edge;
a light-emitting surface which is opposite to the light-incident surface and has a second outer peripheral edge and a second inner peripheral edge;
an outer surface connecting the first outer peripheral edge and the second outer peripheral edge; and
an inner surface connecting the first inner peripheral edge and the second inner peripheral edge;
wherein a first opening defined by the inner surface adjacent to the first inner peripheral edge is larger than a second opening defined by the inner surface adjacent to the second inner peripheral edge.
2. The light guide element of claim 1, wherein the first opening is located at the light-incident surface, the second opening is located at the light-emitting surface, and a diameter of the first opening is larger than a diameter of the second opening.

3. The light guide element of claim 1, wherein an annular trench is disposed on the light-incident surface.

4. The light guide element of claim 1, wherein the light guide element has a first segment with curvature and a second segment without curvature.

5. The light guide element of claim 4, wherein the second segment is more protruding than the first segment.

6. The light guide element of claim 1, further comprising a convex lug adjacent to the light-incident surface.

7. A lamp, comprising:
  a base;
  a light source disposed on the base;
  a socket which is disposed on the base and fixes the light source on the base; and
  a light guide element of claim 1 engaged with the socket, wherein the light source faces the light-incident surface of the light guide element.

8. The lamp of claim 7, wherein the first opening is located at the light-incident surface, the second opening is located at the light-emitting surface, and a diameter of the first opening is larger than a diameter of the second opening.

9. The lamp of claim 8, wherein an annular trench is disposed on the light-incident surface, and the light source is located in the annular trench.

10. The lamp of claim 7, wherein the light guide element has a first segment with curvature and a second segment without curvature.

11. The lamp of claim 10, wherein the second segment is more protruding than the first segment.

12. The lamp of claim 7, wherein the light guide element further comprises a convex lug adjacent to the light-incident surface, the socket further comprises a flange engaged with the convex lug.

13. The lamp of claim 7, wherein the light source comprises a circuit board and a plurality of light emitting diodes disposed on the circuit board in annular arrangement.

14. The lamp of claim 13, wherein the circuit board has a protruding portion, and the socket has a notch engaged with the protruding portion of the circuit board.

15. The lamp of claim 7, wherein the socket is fixed on the base by screwing members.

* * * * *